United States Patent
East

(10) Patent No.: US 8,290,817 B2
(45) Date of Patent: Oct. 16, 2012

(54) SELECTABLE OPTIONS FOR DOWNLOADING DIGITAL CONTENT TO A MOBILE TERMINAL

(75) Inventor: Allen M. East, Cary, NC (US)

(73) Assignee: Sony Mobile Communications AB, Lund (SE)

( * ) Notice: Subject to any disclaimer, the term of this patent is extended or adjusted under 35 U.S.C. 154(b) by 2320 days.

(21) Appl. No.: 11/177,182

(22) Filed: Jul. 8, 2005

(65) Prior Publication Data

US 2007/0011061 A1    Jan. 11, 2007

(51) Int. Cl.
*G06Q 30/00* (2006.01)
*H04L 9/00* (2006.01)
(52) U.S. Cl. .......................... 705/26; 713/165
(58) Field of Classification Search .................. 705/26
See application file for complete search history.

(56) References Cited

U.S. PATENT DOCUMENTS

| | | | | |
|---|---|---|---|---|
| 6,448,987 | B1 * | 9/2002 | Easty et al. | 715/834 |
| 7,272,842 | B2 * | 9/2007 | Kay et al. | 725/1 |
| 2002/0144275 | A1 * | 10/2002 | Kay et al. | 725/87 |
| 2004/0059913 | A1 * | 3/2004 | de Jong | 713/165 |

FOREIGN PATENT DOCUMENTS

| | | |
|---|---|---|
| EP | 1195998 | 4/2002 |
| EP | 1 436 744 | 7/2004 |
| EP | 1 526 678 | 4/2005 |
| WO | WO 2004/070508 | 8/2004 |

OTHER PUBLICATIONS

International Search Report, International Application No. PCT/US2006/006352, Mailed May 26, 2006.
International Preliminary Report on Patentability, International Application No. PCT/US2006/006352, Mailing Date: Nov. 22, 2007.

* cited by examiner

*Primary Examiner* — Garcia Ade
(74) *Attorney, Agent, or Firm* — Coats & Bennett, P.L.L.C.

(57) ABSTRACT

A user may select and purchase digital content for a mobile terminal over a wireless communication system. The user may select among two or more delivery options, each having a different price. Immediate delivery may be selected at a first price; and delayed delivery may be selected at a second price less than the first price. The immediate delivery may be via a high-speed wireless channel at the first price, or a low-speed wireless channel at a third price less than the first price. The delayed delivery may be during off-peak usage time of the wireless communication system at the second price, or via a wired communication system at a fourth price less than the second price. The mobile terminal may dock to a terminal connected to a wired communication system to download the purchased digital content, transmitting a unique identifier to the content provider for identification.

16 Claims, 3 Drawing Sheets

SELECTABLE OPTIONS FOR DOWNLOADING DIGITAL CONTENT TO A MOBILE TERMINAL

BACKGROUND

The present invention relates generally to the field of wireless communication and in particular to a method of providing a mobile terminal user a variety of download options for purchased digital content, at various prices.

Wireless communications system mobile terminals include increasingly sophisticated audio-visual playback and interaction, as well as data processing and networking capability. This sophistication enables uses to engage in a wide variety of activities using the mobile terminal, such as high-fidelity audio playback, still and video image storage and playback, gaming, Internet browsing, e-mail, and the like, in addition to traditional voice communications. To satisfy the growing demand for mobile terminal digital content—which may include digital audio and video content, executable files such as games, mobile terminal features and enhancements such as ring tones, and the like—various content providers have arisen to supply the digital content to users for a price. The content providers may maintain merchant websites on the Internet, may be integrated into one or more wireless communications system, and/or may be accessed by the mobile terminal in other ways.

The content providers may offer a wide array of digital content for purchase, lease, or license by mobile terminal users. A broad array of economic models may be supported. For example, digital content may be made available on a pay-per-view basis. Alternatively, a user may purchase, lease, or license an instance of digital content that allows unlimited playback (perhaps limited to a specific mobile terminal). In general, digital content may be sold, leased, or licensed in a variety of packages and options, as known to those of skill in the art or as may be developed. As used herein, the term "purchase" of digital content encompasses all such transactions.

Regardless of the price or terms under which digital content is purchased, delivery of the digital content to the user's mobile terminal remains problematic, and has economic repercussions. For example, the bandwidth currently available in many wireless communication systems is insufficient to support the immediate, high-speed download of digital content from a content provider to a user's mobile terminal—at least without incurring significant additional costs. While bandwidth is anticipated to increase due to technological evolution, concomitant technological evolution in mobile terminals will support—and users will demand—digital content of ever-increasing size (e.g., full-length movies). Furthermore, wireless communication system bandwidth will likely continue to lag wired communication system bandwidth.

In many cases, delivery of digital content across a wireless communications system will impose an additional cost on the transaction. This delivery cost may be minimal or may not exist at all in the case of delivery via a wired communication network. For example, a digital audio file (e.g., MP3) for a popular song may cost 99¢, with no delivery charge, on the Internet. However, in purchasing the same song from a user's mobile terminal, the user may incur the digital content cost of 99¢, and additionally a significant delivery fee, assuming the user requires or desires immediate, high-speed delivery.

SUMMARY

A user may select and purchase digital content for a mobile terminal over a wireless communication system. The user may select among two or more delivery options, each having a different price. Immediate delivery may be selected via a high-speed or low-speed wireless channel. Delayed delivery may be during off-peak usage time of the wireless communication system. Alternatively, delayed delivery may be via a wired communication system. The mobile terminal may dock to a data terminal connected to a wired communication system, transmit a unique identifier to the content provider, and download previously purchased digital content.

In one embodiment, the present invention relates to a flexible method of delivering digital content purchased via a mobile terminal. A selection of digital content for purchase by a user is accepted from the mobile terminal, via a wireless communication system. The option of immediate delivery of the purchased digital content at a first price is offered to the user. The option of delayed delivery of the purchased digital content at a second price lower than the first price is offered to the user. Selection of a delivery option is accepted from the mobile terminal, via the wireless communication system. The user is charged a price in response to the selected delivery option. The purchased digital content is delivered to the user.

In another embodiment, the present invention relates to a mobile terminal. The mobile terminal includes a transceiver operative to communicate data over a wireless communication system. The mobile terminal also includes a wired communication system terminal interface operative to communicate data between the mobile terminal and a data terminal communicatively coupled to a wired communication system. The mobile terminal further includes memory storing a digital content purchase flag indicating digital content purchased over the wireless communication system for delivery via a wired communication system. The mobile terminal additionally includes a controller operative to download purchased digital content via a wired communication system upon connection of the mobile terminal to a wired communication system terminal, in response to the digital content purchase flag.

In another embodiment, the present invention relates to a computer readable medium including one or more computer programs operative to cause a computer to vend and deliver digital content purchased via a mobile terminal. A selection of digital content for purchase by a user is accepted from the mobile terminal, via a wireless communication system. The option of immediate delivery of the purchased digital content at a first price is offered to the user. The option of delayed delivery of the purchased digital content at a second price lower than the first price is offered to the user. Selection of a delivery option is accepted from the mobile terminal, via the wireless communication system. The user is charged a price in response to the selected delivery option. The purchased digital content is delivered to the user.

DETAILED DESCRIPTION

Figure 1:
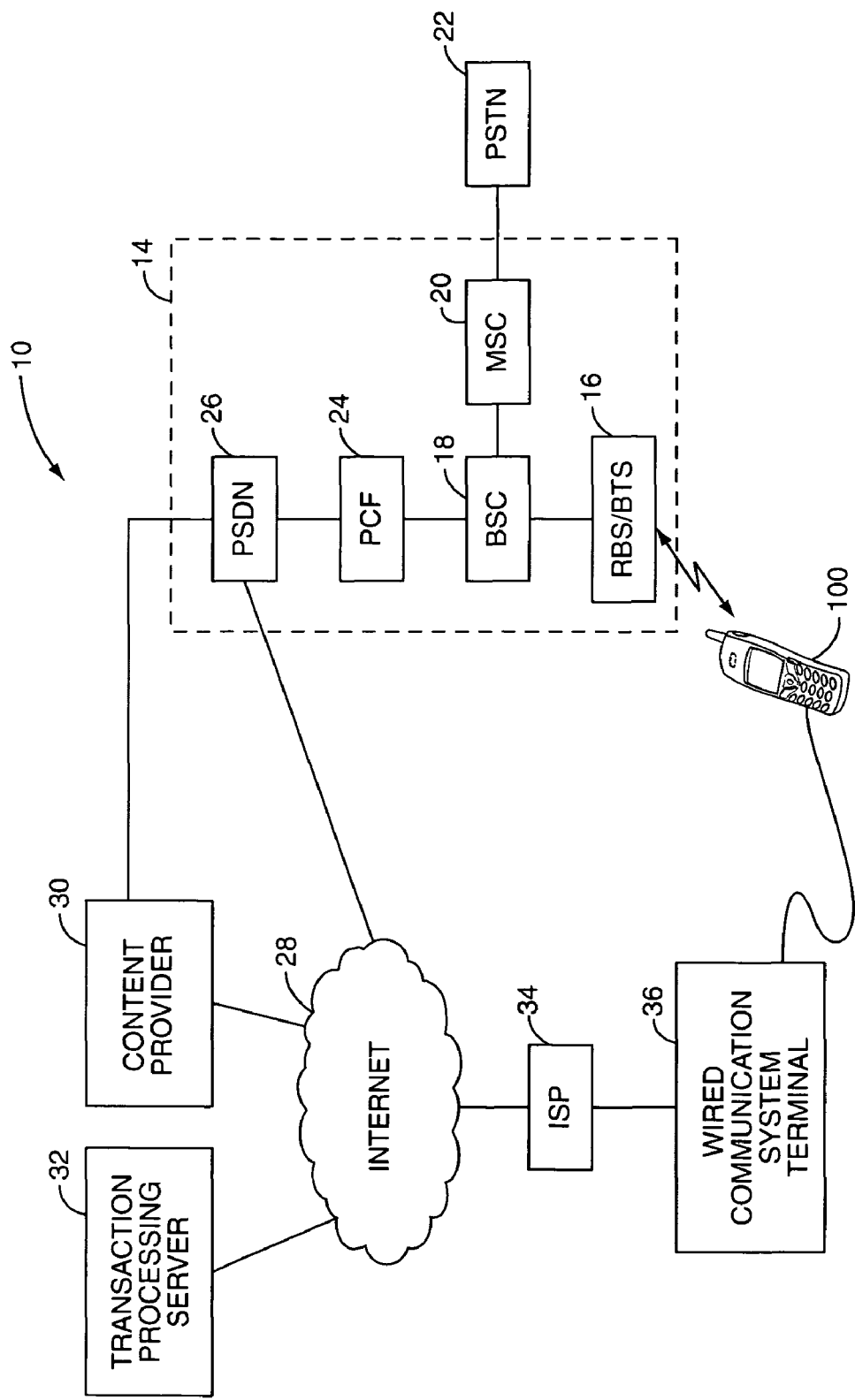
FIG. 1 is a functional block diagram of a mobile terminal connected to both wired and wireless communication networks.

FIG. 1 depicts a representative, interconnected wired/wireless communication system, indicated generally by the numeral 10. A mobile terminal 100 communicates with a wireless communication system 14. The wireless communication system 14 may operate according to any of a variety of industry standard protocols, such as such as a CDMA, WCDMA, GSM/GPRS, EDGE, or UMTS, as known in the art.

The wireless communication system 14 includes a Radio Base Station (RBS) 16, also known as a Base Transceiver Station (BTS), that controls and manages the wireless link to the mobile terminal 100. The RBS/BTS 16 connects to and operates under the control of a Base Station Controller (BSC) 18. A BSC 18 may control a plurality of RBS/BTS 16 (not shown). Telephonic communications from the mobile terminal 100 may be routed from the BSC 18 to a Mobile Switching Center (MSC) 20, for routing to another mobile terminal 100 or to a land-line telephone in the Public Switch Telephone Network (PSTN) 22. The BSC 18 may additionally be connected to a Packet Control Facility (PCF) 24, which in turn may interface to a variety of packet data switched networks, such as the Internet 28, via a Packet Data Switching Node (PDSN) 26. FIG. 1 is representative only; the structure and operation of wireless communication systems 14 are well known to those of skill in the art, and are not further elaborated herein.

The mobile terminal 100 may additionally be connected to a wired communication system terminal 36, such as for example a network-equipped Personal Computer (PC). The wired communication system terminal 36 is communicatively coupled, such as through an Internet Service Provider (ISP) 34, to a wired communication system, such as the Internet 28. The structure and operation of a wired communication system 28 such as the Internet are well known to those of skill in the art, and are not further elaborated herein.

A content provider 30 provides digital content for purchase by the user of the mobile terminal 100, and optionally by users on the Internet 28. The content provider 30 may connect to the wireless communication system 14 through the Internet 28, as shown. Alternatively, the content provider 30 may maintain a direct connection to the PDSN 26, such as may be the case where the content provider 30 is partnered with the operator of the wireless communication system 14. Users of mobile terminals 100 may access and browse digital content provided by the content provider 30, select items of digital content for purchase, and pay for the digital content, all via a mobile terminal 100 utilizing the wired communication system 14. To facilitate these transactions, the content provider 30 may utilize a transaction processing server 32, either by a direct connection or across the Internet 28, as well known in the art. As FIG. 1 depicts, the mobile terminal 100 may communicatively connect to the content provider 30 either through the wireless communication system 14 or through the Internet 28.

Figure 2:
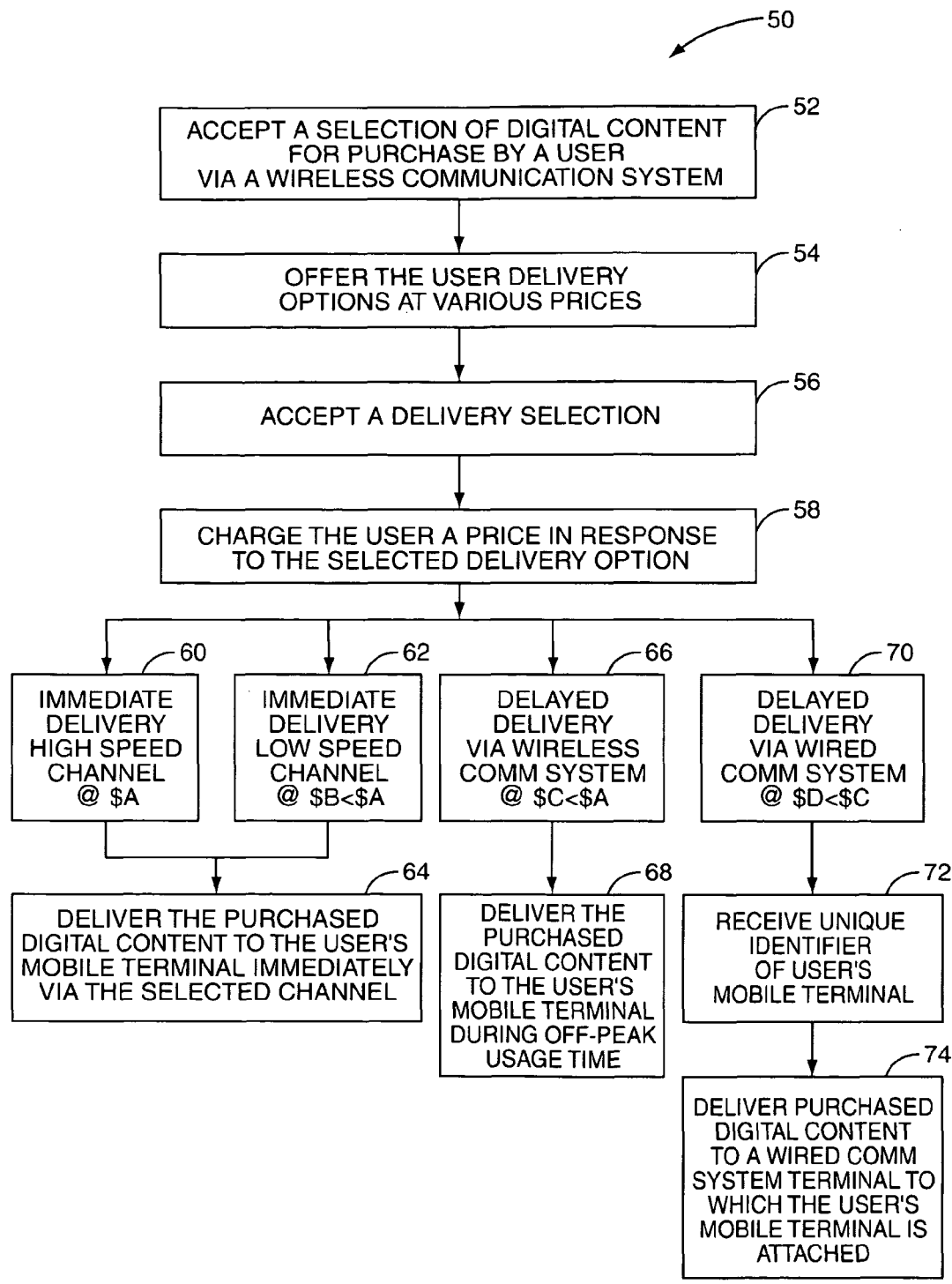
FIG. 2 is a flow diagram of a method of delivering digital content to a mobile terminal by a content provider.

According to various embodiments of the present invention, digital content is available to a user on a mobile terminal 100, for selection and purchase via the wireless communication system 14, with delivery of the digital content being provided according to various options, each delivery option having a concomitant delivery charge. FIG. 2 depicts a method of providing digital content by a content provider 30, indicated generally by the number 50. Preliminarily (not shown), the mobile terminal 100 accesses the content provider 30 and identifies itself, such as by transfer of the International Mobile Equipment Identity (IMEI) code, a unique identifier assigned to every mobile terminal 100. The transfer of the IMEI may occur as part of the wireless communication system 14 overhead. Alternatively, the unique identifier may be a hash or digital signature derived by an encryption system. As another alternative, the unique identifier may be assigned to the mobile terminal 100 by the content provider 30, such as the "cookie" technology employed in the Internet 28. The user then browses the digital content available and makes his or her selection(s).

The content provider 30 accepts a selection of digital content for purchase by a user (block 52), the selection made via wireless communication system 14. The content provider 30 then offers the user two or more delivery options, each option including a different price (block 54). The content provider 30 accepts a delivery option selection user (block 56), the selection made via wireless communication system 14. The content provider 30 then charges the user a price determined in response to the selected delivery option (block 58)—the price comprising a base price for the digital content and a delivery charge based on the selected delivery option. The content provider 30 may access and utilize the services of a transaction processing server 32 in charging the user for the price of the selected digital content and delivery option.

Delivery of the digital content to the user, and the price charged to the user, depend on the user's selection of delivery mode and time. For example, the user may choose immediate delivery of the digital content on a high-speed channel of the wireless communication system 14. This delivery option may result in a certain price for the delivered content, denoted by $A (block 60). Alternatively, if the user selected immediate delivery via a low-speed channel of the wireless communication system 14, the total price charged may be a different price $B, less than $A (block 62). If either immediate delivery option is selected, the content provider 30 delivers the purchased digital content to the user's mobile terminal 100 immediately via the selected channel (e.g., the high- or low-speed channel) of the wireless communication system 14 (block 64).

As another option, the user may select delayed delivery of the digital content via the wireless communication system 14. This option may incur another price, $C, where $C is less than $A (block 66). Note that in a given implementation, the price $C may be less than the price $B as well. Under this delivery option, the content provider 30 will deliver the purchased digital content to the user's mobile terminal 100 during an off-peak usage time of the wireless communication network 14 (block 68).

As yet another option, the user may select delayed delivery of the digital content via a wired communication system. This option may result in a still another price $D, where $D is less than $C (block 70). In one embodiment, $D may reflect only the price of the digital content itself, i.e., the delivery charge may be zero.

When the mobile terminal 100 selects the option of delayed delivery via a wired communication system (block 70), the mobile terminal 100 may store an indicator, or flag, in memory. When the mobile terminal 100 later connects or "docks" to a wired communication system terminal, such as the PC 36, the flag may prompt a PC application program in the mobile terminal 100 to access the content provider 30 through the wired communication system interface of the PC 36, and request download of the previously purchased digital content. At this point, the mobile terminal 100 must transmit a unique identifier to the content provider 30. This identifier, of course, must be the same as that supplied to the content provider 30 when the selection (blocks 52, 56) and purchase (block 58) were made. Upon receipt of the mobile terminal 100 unique identifier (block 72), the content provider 30 delivers the purchased digital content across the wired communication system (e.g., Internet 28) to the PC 36 to which the mobile terminal 100 is docked (block 74). The mobile terminal 100 may then receive the digital content and store it for future playback, execution, or the like.

In this manner, the user of a mobile terminal 100 may select and purchase a variety of digital content via the wireless communication system 14, and may choose a delivery option that balances the immediacy and duration of the download with its cost. In one embodiment, the cost of downloading the digital content may be avoided altogether by connecting the mobile terminal 100 to an Internet-connected PC 36, and downloading the digital content via the Internet 28.

Figure 3:
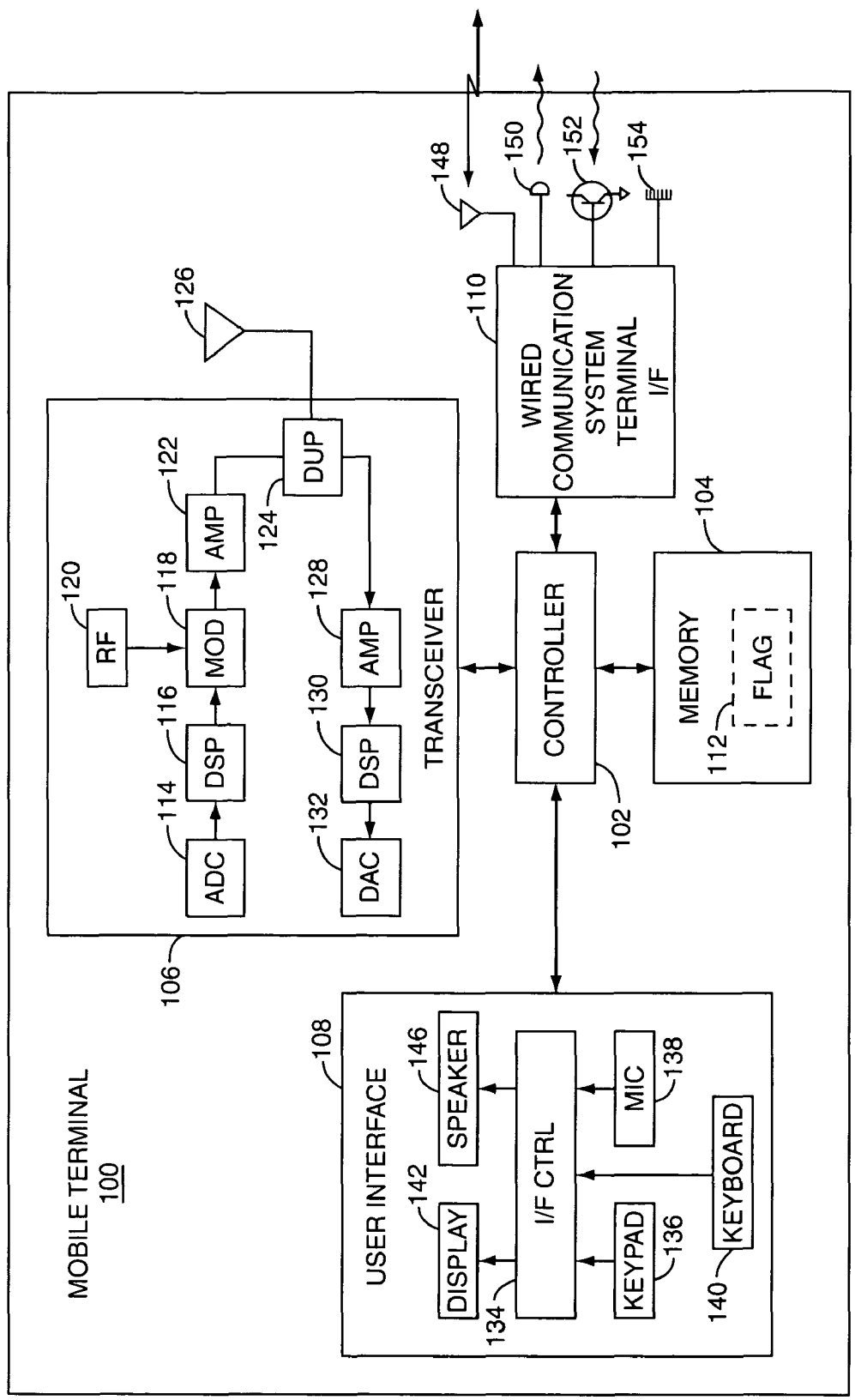
FIG. 3 is a functional block diagram of a mobile terminal.

FIG. 3 depicts a functional block diagram of a mobile terminal 100 configured and equipped to effect all of the above described digital download options. The mobile terminal 100 includes a controller 102, memory 104, a transceiver 106, user interface 108, and wired communication system terminal interface 110.

The controller 102 is a stored program microprocessor, microcontroller, digital signal processor, or the like as well known in the art. The controller 102 controls the overall operation of the mobile terminal 100, executing programs from memory 104, which may comprise RAM, ROM, EPROM, FLASH, and/or magnetic or optical media.

The transceiver 106 includes transmit and receive circuits necessary to effect two-way voice and data communication across a wireless communication link 12. The transmitter chain includes an Analog to Digital Converter (ADC) 114 to convert voice signals to digital format; a Digital Signal Processor (DSP) 116 to encode the digital voice and/or data; a modulator 118, receiving a Radio Frequency (RF) signal from an oscillator 120, for modulating the encoded signal onto an RF carrier; and a power amplifier 122. The encoded, modulated, amplified signal is routed by a duplexer 124 to an antenna 126 for transmission to a RBS/BTS 16. In the receiver chain, signals received by the antenna 126 from a RBS/BTS 16 are routed by the duplexer 124 to a Low Noise Amplifier (LNA) 128; a Digital Signal Processor (DSP) 130 for demodulation, decoding, and baseband processing; and Digital to Analog Converter 132 for converting digitally encoded speech signals into audible signals. The transceiver 106 includes all circuits and functionality necessary to effect a fully functional duplex wireless transceiver in accordance with the protocol of the wireless communication system 14.

The user interface 108 accepts from, and provides output to, the user of the mobile terminal 100. An interface controller 134 accepts input from at least a keypad 136 and a microphone 138. The mobile terminal 100 may additionally include a full or partial alphanumeric keyboard 140, which also provides input to the interface controller 134. The interface controller 134 directs visual output to a display 142 and audio output to one or more speakers 146. The user may access the user interface 108 to control the operation of the mobile terminal 100, enter telephone numbers, navigate menus, and the like. Additionally, the user may utilize the user interface 108 to effect communications with the content provider 30 when the user accesses the content provider 30 via the wireless communication network 14.

The wired communication system terminal interface 110 provides an interface between the mobile terminal 100 and a wired communication system terminal, such as a PC 36 connected to a wired communication system, such as the Internet 28. The interface between the mobile terminal 100 and the PC 36 may comprise a Bluetooth interface, with communication signals routed through an antenna 148. Alternatively, the link may comprise an infrared data link, with data transmitted from the mobile terminal 100 by IR LED 150, and received from the PC 36 by IR phototransistor 152. As another alternative, the interface may comprise a physical connector 154.

Activation of the wired communication system terminal interface 110 may launch or activate a software module, such as a PC application, by the controller 102. According to one or more embodiments of the present invention, the PC application may check for the presence of a flag 112 in memory 104, indicating that the user has purchased digital content from a content provider 30, which is awaiting download via the wired communication system 28. In this case, the PC application may transmit control and data signals through the wired communication system terminal interface 110 to, e.g., a PC 36, to connect across the Internet 28 to the content provider 30. The IMEI or other unique identifier of the mobile terminal 100 is additionally transmitted to the content provider 30. In turn, upon verifying the identity of the user via the unique identifier, the content provider 30 provides the previously purchased digital content across the Internet 28 to the attached PC 36 to the mobile terminal 100. In this manner, the mobile terminal 100 may receive purchased digital content while minimizing or even eliminating charges associated with delivering that content through the wireless communication network 14.

As used herein, the term "mobile terminal" may include a cellular radiotelephone with or without a multi-line display; a Personal Communications System (PCS) terminal that may combine a cellular radiotelephone with data processing, facsimile and data communications capabilities; a Personal Digital Assistant (PDA) that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A flexible method of delivering digital content purchased via a mobile terminal, comprising:
  accepting from the mobile terminal, via a wireless communication system, a selection of digital content for purchase by a user;
  offering the option of immediate delivery of the purchased digital content at a first price;
  offering the user the option of delayed delivery of the purchased digital content at a second price lower than the first price;
  accepting selection of a delivery option from the mobile terminal, via the wireless communication system;
  charging the user a price in response to the selected delivery option; and
  delivering the purchased digital content to the user.

2. The method of claim 1 wherein charging the user a price in response to the selected delivery option comprises charging the user a base price for the selected digital content and a delivery charge determined in response to the selected delivery option.

3. The method of claim 1 wherein offering the user the option of immediate delivery of the purchased digital content at a first price comprises offering the user the option of immediate delivery of the purchased digital content over a high speed channel of the wireless communication system at the first price.

4. The method of claim 3 further comprising offering the user the option of immediate delivery of the purchased digital content over a low speed channel of the wireless communication system at a third price lower than the first price.

5. The method of claim 1 wherein offering the user the option of delayed delivery of the purchased digital content at a second price lower than the first price comprises offering the user the option of delayed delivery of the purchased digital content over the wireless communication system at the second price.

6. The method of claim 5 wherein delivering the purchased digital content to the user comprises delivering the purchased digital content to the user during an off-peak usage time of the wireless communication system.

7. The method of claim 5 further comprising offering the user the option of delayed delivery of the purchased digital content over a wired communication system at a fourth price lower than the second price.

8. The method of claim 7 wherein the fourth price does not include any delivery charge.

9. The method of claim 7 wherein delivering the purchased digital content to the user comprises transmitting the purchased digital content over the wired communication system to a wired communication system terminal to which the mobile terminal is connected.

10. The method of claim 9 wherein transmitting the purchased digital content over the wired communication system comprises accepting a unique identifier from the mobile terminal, and transmitting the purchased digital content to the mobile terminal via the wired communication system terminal in response to the unique identifier.

11. The method of claim 10 wherein the unique identifier is an International Mobile Equipment Identity (IMEI).

12. A computer readable medium including one or more computer programs operative to cause a computer to vend and deliver digital content purchased via a mobile terminal, the computer programs causing the computer to perform the steps of:

accepting from the mobile terminal, via a wireless communication system, a selection of digital content for purchase by a user;

offering the option of immediate delivery of the purchased digital content at a first price;

offering the user the option of delayed delivery of the purchased digital content at a second price lower than the first price;

accepting selection of a delivery option from the mobile terminal, via the wireless communication system;

charging the user a price in response to the selected delivery option; and delivering the purchased digital content to the user.

13. The computer readable medium of claim 12 wherein offering the user the option of immediate delivery of the purchased digital content at a first price comprises offering the user the option of immediate delivery of the purchased digital content over a high speed channel of the wireless communication system at the first price.

14. The computer readable medium of claim 13, said computer programs causing the computer to further perform the step of offering the user the option of immediate delivery of the purchased digital content over a low speed channel of the wireless communication system at a third price lower than the first price.

15. The computer readable medium of claim 1 wherein offering the user the option of delayed delivery of the purchased digital content at a second price lower than the first price comprises offering the user the option of delayed delivery of the purchased digital content over the wireless communication system at the second price.

16. The computer readable medium of claim 15, said computer programs causing the computer to further perform the step of offering the user the option of delayed delivery of the purchased digital content over a wired communication system at a fourth price lower than the second price.

* * * * *